(12) United States Patent
Konstant

(10) Patent No.: US 7,234,267 B1
(45) Date of Patent: Jun. 26, 2007

(54) WEEDLESS FISHING LURE

(76) Inventor: Anthony N. Konstant, 920 Fisher La., Winnetka, IL (US) 60092

( * ) Notice: Subject to any disclaimer, the term of this patent is extended or adjusted under 35 U.S.C. 154(b) by 0 days.

(21) Appl. No.: 11/437,400

(22) Filed: May 18, 2006

Related U.S. Application Data

(63) Continuation-in-part of application No. 11/399,567, filed on Apr. 5, 2006, now abandoned.

(51) Int. Cl.
*A01K 85/02* (2006.01)
*A01K 85/00* (2006.01)

(52) U.S. Cl. .................. 43/42.36; 43/42.41; 43/42.24; 43/42.39

(58) Field of Classification Search ................ 43/42.1, 43/42.41, 42.4, 42.24, 42.36, 42.39
See application file for complete search history.

(56) References Cited

U.S. PATENT DOCUMENTS

| | | | | |
|---|---|---|---|---|
| 981,454 A * | 1/1911 | Miller et al. | | 43/42.1 |
| 1,333,318 A * | 3/1920 | Kijima | | 43/42.36 |
| 1,454,820 A * | 5/1923 | Readle | | 43/42.05 |
| 1,515,849 A * | 11/1924 | Eppinger | | 43/42.4 |
| 1,768,033 A * | 6/1930 | Deatz | | 43/42.4 |
| 1,848,704 A * | 3/1932 | Farley | | 43/42.36 |
| 1,948,983 A * | 2/1934 | Danielesuk | | 43/42.1 |
| 2,241,367 A * | 5/1941 | Sarff | | 43/42.1 |
| 3,170,756 A * | 2/1965 | Butler | | 43/42.1 |
| 3,269,050 A * | 8/1966 | Garwood | | 43/42.36 |
| 3,426,467 A * | 2/1969 | Bryant | | 43/42.36 |
| 3,740,889 A * | 6/1973 | Scott | | 43/42.36 |
| 3,908,298 A * | 9/1975 | Strader | | 43/42.41 |
| 3,914,895 A * | 10/1975 | Mize | | 43/42.1 |
| 4,054,004 A * | 10/1977 | Schott | | 43/42.1 |
| 4,094,087 A * | 6/1978 | Carpenter | | 43/42.24 |
| 4,163,337 A * | 8/1979 | Kress | | 43/42.36 |
| 4,167,076 A * | 9/1979 | Weaver | | 43/42.36 |
| 4,703,579 A * | 11/1987 | Kay | | 43/42.24 |
| 4,744,167 A * | 5/1988 | Steele | | 43/42.1 |
| 4,744,168 A * | 5/1988 | McClellan | | 43/42.24 |
| 4,785,572 A * | 11/1988 | Crumley | | 43/42.39 |
| 4,803,798 A * | 2/1989 | Hannah | | 43/42.36 |
| 4,817,325 A * | 4/1989 | Thomas | | 43/42.1 |
| 4,884,359 A * | 12/1989 | Wray | | 43/42.43 |
| 4,907,364 A * | 3/1990 | Hedman | | 43/42.39 |
| 4,914,851 A * | 4/1990 | Acker | | 43/42.41 |
| 4,922,647 A * | 5/1990 | Tompkins | | 43/42.44 |
| 4,942,689 A * | 7/1990 | Link et al. | | 43/42.24 |
| 4,969,287 A * | 11/1990 | Johnson | | 43/42.24 |
| 5,025,586 A * | 6/1991 | Pixton | | 43/42.24 |
| 5,040,325 A * | 8/1991 | Herrmann | | 43/42.36 |
| 5,113,607 A * | 5/1992 | Pate | | 43/42.36 |
| 5,129,175 A * | 7/1992 | Pixton | | 43/42.39 |
| 5,144,765 A * | 9/1992 | Keeton | | 43/42.36 |
| 5,152,094 A * | 10/1992 | Strickland | | 43/42.24 |
| 5,335,441 A * | 8/1994 | Blackwell | | 43/42.36 |
| 5,490,345 A * | 2/1996 | Infinger | | 43/42.39 |
| 5,832,655 A * | 11/1998 | Crumrine | | 43/42.39 |
| 6,061,948 A * | 5/2000 | Boucek | | 43/42.36 |
| 6,161,326 A * | 12/2000 | Ratte | | 43/42.39 |
| 6,519,895 B1 * | 2/2003 | Bennett | | 43/42.39 |
| 6,571,508 B2 * | 6/2003 | Brinkman | | 43/42.24 |
| 6,598,336 B2 * | 7/2003 | Link | | 43/42.24 |
| D478,960 S * | 8/2003 | Acker | | D22/126 |
| D478,961 S * | 8/2003 | Acker | | D22/126 |
| 2003/0159328 A1* | 8/2003 | Acker | | 43/42.37 |

* cited by examiner

*Primary Examiner*—Darren W. Ark
(74) *Attorney, Agent, or Firm*—Niro, Seavone, Haller & Niro

(57) ABSTRACT

A weedless and/or snagless fishing lure is provided having a tapered, substantially rigid head having a cavity that encases the front end of a hook and fish attractant so that the lure has a smooth transition from front to back.

6 Claims, 3 Drawing Sheets

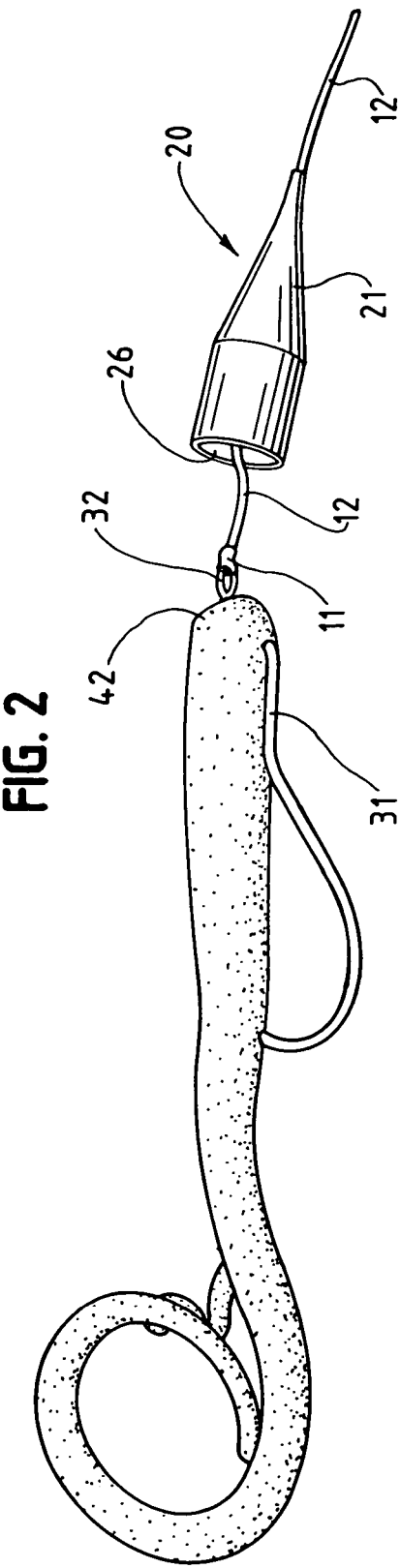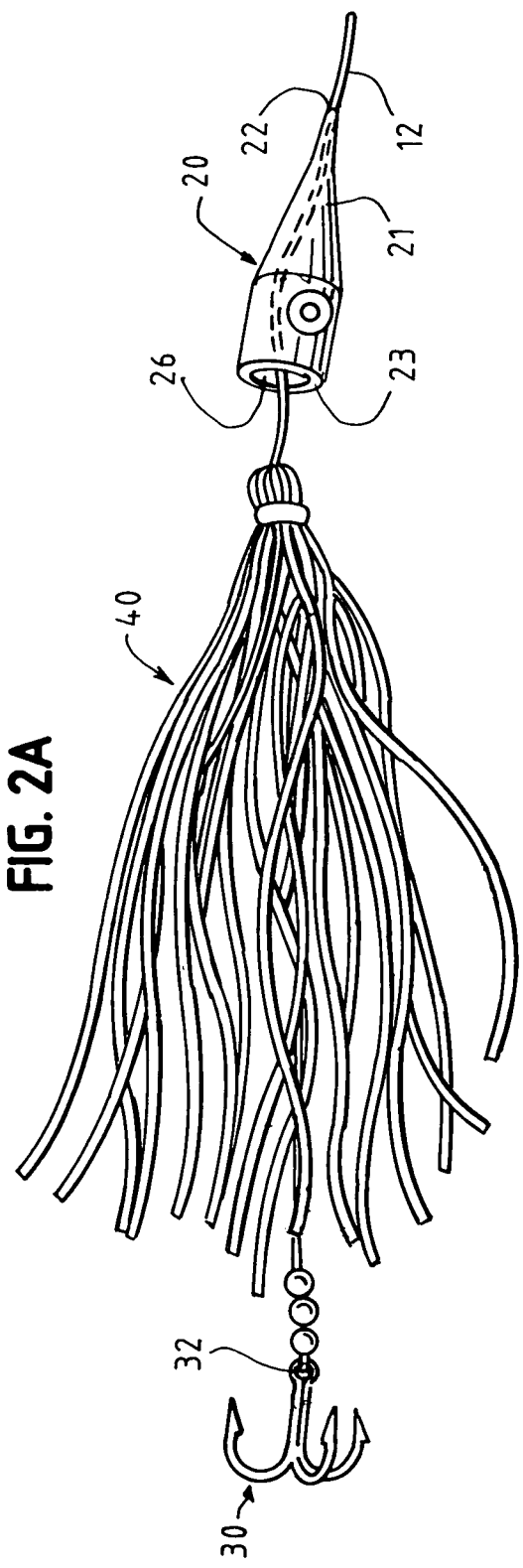

WEEDLESS FISHING LURE

This application is a continuation-in-part of U.S. patent application Ser. No. 11/399,567, filed on Apr. 5, 2006 now abandoned.

BACKGROUND OF THE INVENTION

The present inventions relate to fishing lures. More particularly, the present inventions relate to weedless and/or snagless fishing lures.

There are numerous fishing lures available that claim to be weedless or snagless. However, the available fishing lures that claim to be weedless or snagless suffer from a number of drawbacks. For example, while many of the available lures claim to have a weedless hook, other parts of the lure, sinker, hook or swivel can become snagged and/or weeded. Such examples include those lures shown and described in U.S. Pat. Nos. 4,703,579; 4,884,359; and 4,922,647.

Other available lures that claim to be weedless or snagless have, among other deficiencies, flexible or resilient heads that are prone to snagging and/or shield the hooks with collars or other members that interfere with effective fish hooking. Examples of such lures are shown and described in U.S. Pat. Nos. 4,914,851 and 4,744,167.

SUMMARY OF THE INVENTION

The present inventions preserve the advantages of known weedless/snagless lures and also provide new features and advantages. For example, the present inventions provide a weedless/snagless lure that has a rigid head and has a generally smooth taper and/or transition from the fishing line at the front end, along the body of the lure to the hook and the remaining portion of the lure.

In a preferred embodiment of the present inventions, a fishing lure having a hook with an eye, a shank and barb portion is provided. The lure includes a substantially rigid head that is tapered from front to back, the head being adapted to accommodate fishing line or leader through the center and having a cavity at its back end. The hook is adapted at the front end of the shank to fit within the cavity of the tapered head and to secure the front end of a fish attractant. The fish attractant, along with the front end of the hook, is capable of fitting within and/or being secured in the cavity of the head. The fish attractant may be an artificial worm, feathers, hair, hair-like plastic tinsel, ribbons and the like and may extend toward the back end to partially cover the barb portion of the hook.

Accordingly, it is an object of the present invention to provide a weedless/snagless fishing lure that gradually tapers from the front to the back.

It is also an object of the present invention to provide a weedless/snagless fishing lure that has a substantially rigid head.

Another object of the present invention is to provide a weedless/snagless fishing lure that provides a smooth transition in thickness from the front of the lure to the hook.

An additional object of the present invention is to provide a weedless/snagless fishing lure having a substantially rigid head, the weight of which may be varied depending upon the type of head matched to the type of fishing being conducted.

A further object of the present invention is to provide a weedless/snagless fishing lure having a substantially rigid head with a cavity to accommodate the forward portion of a hook and the leading edge of the remaining portion of the lure.

Still a further object of the present invention is to provide a fishing lure with the ability to accommodate many different types of fish attractants behind the head to attract various species of fish and meet various water conditions.

Still another object of the present invention is to provide a fishing lure that minimizes protrusions along the length of the lure to increase its weedless/snagless property.

Still an additional object of the present invention is to provide a weedless/snagless lure that does not require collars or similar means that may obstruct or shield the points or barbs of a hook.

INVENTOR'S DEFINITION OF THE TERMS

The terms used in the claims of this patent are intended to have their broadest meaning consistent with the requirements of law. Where alternative meanings are possible, the broadest meaning is intended. All words used in the claims are intended to be used in the normal, customary usage of grammar and the English language.

BRIEF DESCRIPTION OF THE DRAWINGS

The stated and unstated features and advantages of the present inventions will become apparent from the following descriptions and drawings wherein like reference numerals represent like elements in the various views, and in which:

FIG. 2 is a side view of a preferred embodiment of the invention of FIG. 1, with the head separated from the remainder of the lure;

FIG. 2A is a side view of the embodiment of the invention of FIG. 1A showing internal portions of the head, with the head separated from the remainder of the lure;

DETAILED DESCRIPTION OF PREFERRED EMBODIMENTS

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

Figure 1:
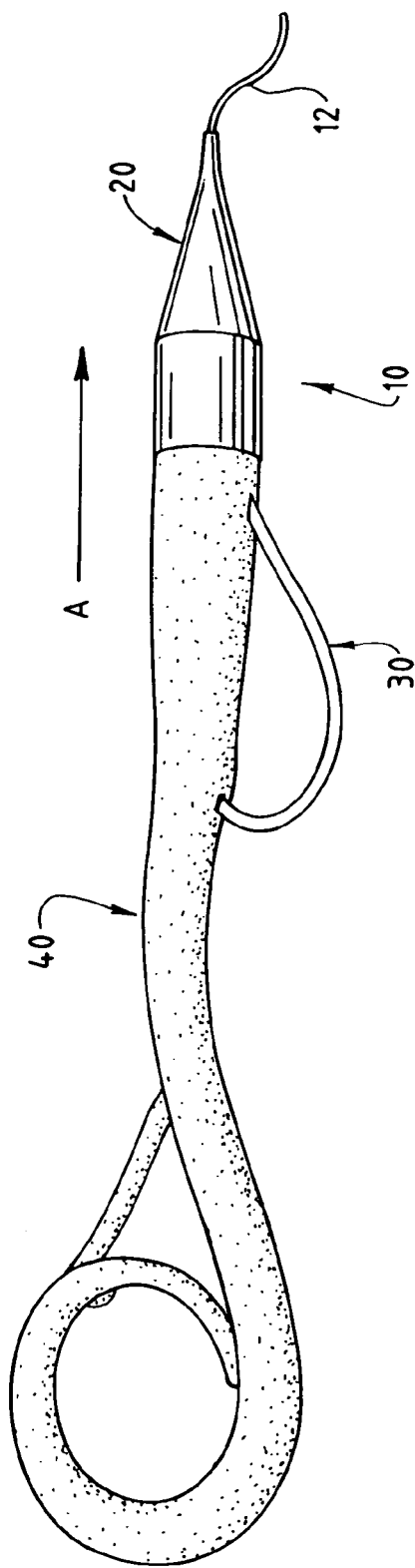
FIG. 1 is a side view of a preferred embodiment of the present invention, shown as it would be used in fishing.
Figure 1A:
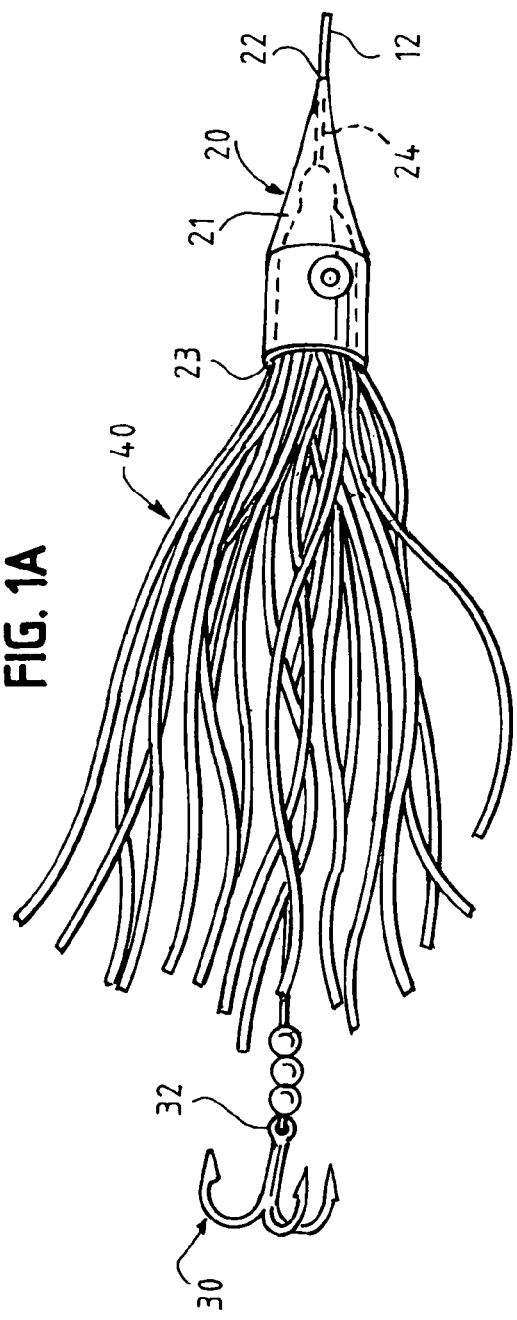
FIG. 1A is a side view of an alternative embodiment of the present invention shown as it would be used in fishing and showing internal portions of the head.

A preferred embodiment of the weedless fishing lure of the present invention is shown generally as 10 in FIG. 1. Weedless lure 10 includes a rigid head 20, a hook 30 and the remaining portion of the lure 40, which may be any variety of fish attracting means, including but not limited to plastic worms and the like (see e.g., FIGS. 1A and 2A). As shown in FIG. 1, and as a general matter, weedless lure 10 of the present invention provides a smooth and gradual transition from the front of the head of the lure 10 to the barb or point 33 of hook 30. In this and other manners, and as hereinafter described, as lure 10 is pulled through the water in the direction of arrow A of FIG. 1, the snagging or weeding of lure 10 is significantly reduced or eliminated.

Figure 3:
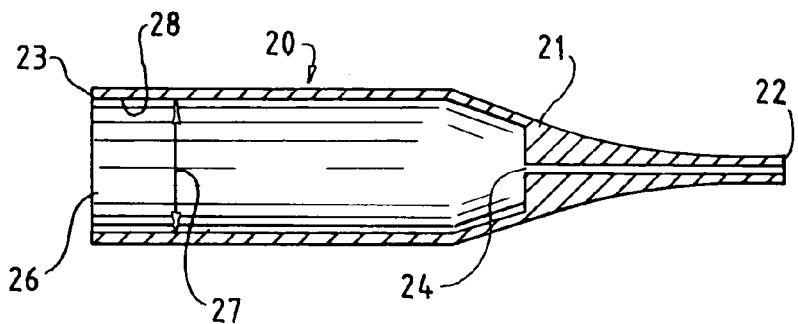
FIG. 3 is a cross-sectional view of a preferred embodiment of a head of the present invention.
Figure 4:
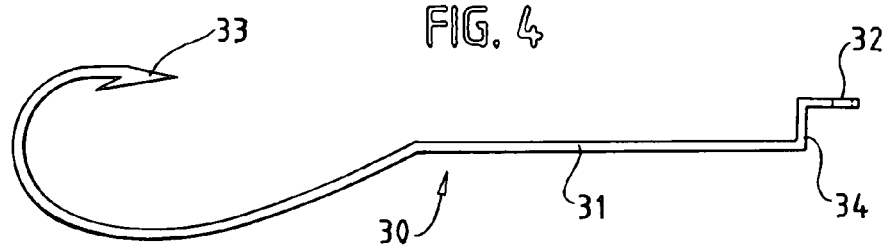
FIG. 4 is a side view showing the configuration of a preferred hook of the present invention.
Figure 5:
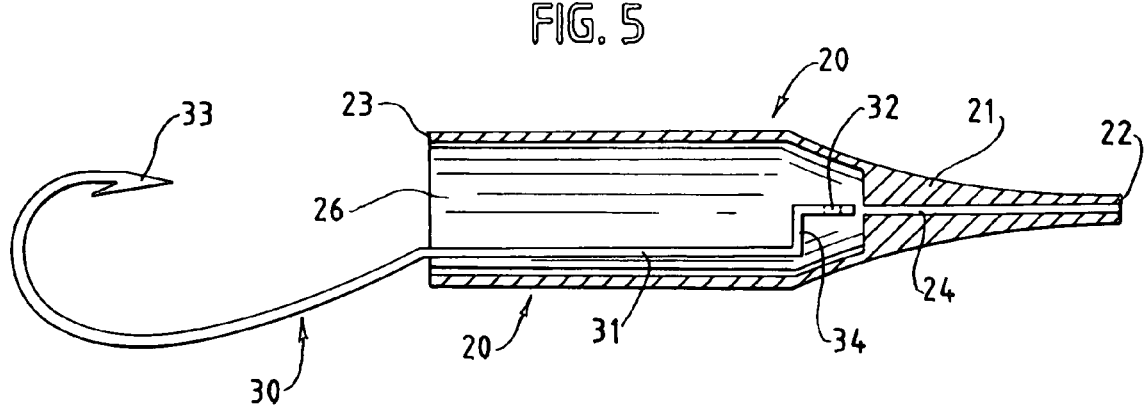
FIG. 5 is a cross-sectional view of a preferred head of FIG. 3 with a preferred hook of FIG. 4 inserted within the cavity of a preferred head.

Details of the principal components of a preferred embodiment of weedless lure 10 may be better seen by reference to FIGS. 3-5. As shown in FIGS. 3 and 5, head 20 includes a body portion 21 having a front end 22 and back end 23. A bore 24 is provided from front 22 to back 23 of body portion 21. Bore 24 is sized to accommodate fishing line 12. It will be understood that line 12 may be a leader material attached to the hook that is then attached to the remainder of the fishing line (not shown). Preferably, bore 24 is just slightly larger than the diameter of line 12 (FIGS. 1 and 2) to provide a slip-fit of head 20 while at the same time minimizing the transition in thickness from line 12 to head 20. In addition, body portion 21 is tapered from front 22 to back 23 to provide a smooth transition in thickness from line 12. Although a curved taper for body portion 21 is shown as preferred, other tapered shapes or graduated steps may be used to practice the invention. These features, alone or along with others, help to make lure 10 weedless and/or snagless.

Body portion 21 of rigid head 20 is also provided with a cavity 26 at the back end 23. Cavity 26 has an inner diameter 27 that in a preferred embodiment is sized to accommodate the front end of hook 30 and the front end 42 of fish attractant 40 as hereinafter described. It will be understood by those of skill in the art that the depth and diameter of cavity 26 may be varied depending upon the weight desired. Similarly, the weight may be chosen depending upon the size or gauge of hook 30 (if inserted into the head cavity 26 as in some embodiments), the type of fish attractant 40, as well as the type of fishing conducted. And, it will also be understood that head 20 may be modified or provided with fish attracting properties, including but not limited to eyes, colors and the like (see e.g., FIGS. 1A and 2A).

The cavity 26 may be provided with optional internal threads, protrusions or other restrictions 28 (not shown) toward the back end 23 of body portion 21 that may be used to better engage the front end 42 of fish attractant 40. In a preferred embodiment, the inner diameter 27 of cavity 26 is slightly smaller than the front end 42 of fish attractant 40, with the front end of hook 30 engaging attractant 40. In this manner, fish attractant 40 is firmly held within the cavity 26 of body portion 21. In addition, a smooth transition from head 20 to hook 30 and fish attractant 40 is also provided.

A preferred hook 30 may best be seen by reference to FIGS. 4 and 5. Preferred hook 30 includes a shank 31 having an eye 32 at its front end to which terminal end 11 of line 12 is attached (shown in FIG. 2) and a barb or sharp point 33 toward the back end of hook 30. In a preferred embodiment, shank 31 has a front shank portion 34 that is formed to be perpendicular to eye 32 as well as the remainder of shank 31. In this manner, the front end of shank 31 may be received within cavity 26 of body portion 21. In addition, the front end 42 of fish attractant 40 may be more firmly secured to the front shank portion 34 and shank 31. Because of the shape of front shank portion 34, the front end 42 of fish attractant 40 and the front end of hook 30 may (but is not required) be encased within cavity 26 of head 20. It is preferred, but not required, that the barb or point 33 of hook 30 be in line with, or within the outer diameter of, body portion 21. This embodiment aids in providing a smooth transition from the front 22 of head 20 through substantially the entire length of lure 10. As a result, there is little or nothing protruding from the back end 23 of head 20 which, along with the tapered body portion 21 of head 20, reduces the weeding or snagging of lure 10.

It will be understood by those of skill in the art that front shank portion 34 of hook 30 does not have to be perpendicular to eye portion 32 and shank portion 31, although this shape is preferred to hold fish attractant 40 and fit within cavity 26. However, it is sufficient for purposes of the present inventions that the front end of hook 30 be configured so that it and the front end 42 of the chosen fish attractant portion 40 may be encased within cavity 26 of head 20.

In a preferred embodiment, fish attractant 40 is an artificial worm as shown in FIGS. 1 and 2. The front end 42 of fish attractant 40 is secured to the front end of hook 30, both of which are encased in cavity 26. Attractant 40 extends rearwardly and may be placed over point 33 of hook 30, thereby minimizing the weeding or snagging of this component. Head 20 is preferably made of a rigid material so that it will not bend and risk getting caught in weeds or other obstructions.

In use, line 12 (and/or leader, etc.) is fed through bore 24 of body portion 21. Eye 32 of hook 30 is then attached to the terminal end 11 of line 12. The front end 42 of fish attractant 40 is then placed on hook 30 (or it may be placed on hook 30 prior to attachment to line 12). The front end of hook 30 and front end 42 of fish attractant portion 40 are then placed in cavity 26. The back portion of fish attractant 40 may then be placed on point 33 of hook 30. Thus, when lure 10 is pulled through the water, the lack of obstruction or protrusion from the front end 22 of head 20 to the point 33 of hook 30 greatly minimizes or reduces the snagging or weeding of lure 10.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention.

Various features of the present inventions are set forth in the following claims.

What is claimed is:

1. A fish lure comprising:
  a rigid head having a front end and a back end and a longitudinal axis extending therebetween, said front end being generally pointed, said rigid head comprising first and second sections, said first section extending from the front end to an intermediate location between the front and back ends, said first section having an outer surface that smoothly continuously tapers concavely and concentrically relative to the longitudinal axis of the rigid head from the intermediate location to the front end, said second section being cylindrical and extending from the intermediate location to the back end, said rigid head having a bore parallel to the longitudinal axis therein with a first end at the front end and a second end at another location between the front end and the intermediate location, said rigid head also having a cavity parallel to the longitudinal axis therein with a first end at the another location between the front end and the intermediate location and a second end at the back end, the cavity being frustoconical between the another location and the intermediate location and being cylindrical between the intermediate location and the second end thereof, the cavity having a larger diameter than the bore, the cavity and the bore communicating with each other at the second end of the bore and the first end of the cavity, the head adapted to accommodate a fishing line or a leader through a center of both the bore and the cavity;

an offset hook having an eye, a shank portion and a barb portion, said shank portion including a first portion attached to the eye, a second portion attached to the barb portion, the first and second portions being parallel to each other, a third portion with a first end attached to the first portion and a second end attached to the second portion, the third portion both extending between and being perpendicular to the first and second portions, said shank portion fits within the cavity of said rigid head; and a fish attractant attached to said hook, a front end of the fish attractant being capable of fitting in the cavity of said head at one end of said fish attractant and at least partially covering the barb portion of the offset hook at another end of said fish attractant.

2. The invention of claim 1 wherein the fish attractant is an artificial worm.

3. The invention of claim 1 wherein the fish attractant includes artificial or natural feathers.

4. The invention of claim 1 wherein the fish attractant includes artificial or natural hair.

5. The invention of claim 1 wherein the fish attractant includes tinsel-like plastic ribbon or plastic hair.

6. The invention of claim 1 wherein the head includes means to help attract fish.

* * * * *